United States Patent
Sawada

(10) Patent No.: US 10,388,928 B2
(45) Date of Patent: Aug. 20, 2019

(54) PROPYLENE-BASED RESIN MICROPOROUS FILM, SEPARATOR FOR BATTERY, BATTERY, AND METHOD FOR PRODUCING PROPYLENE-BASED RESIN MICROPOROUS FILM

(71) Applicant: ASAHI KASEI KABUSHIKI KAISHA, Tokyo (JP)

(72) Inventor: Takahiko Sawada, Osaka (JP)

(73) Assignee: ASAHI KASEI KABUSHIKI KAISHA:, Tokyo (JP)

( * ) Notice: Subject to any disclaimer, the term of this patent is extended or adjusted under 35 U.S.C. 154(b) by 217 days.

(21) Appl. No.: 14/361,078

(22) PCT Filed: Nov. 22, 2012

(86) PCT No.: PCT/JP2012/080274
§ 371 (c)(1),
(2) Date: May 28, 2014

(87) PCT Pub. No.: WO2013/080876
PCT Pub. Date: Jun. 6, 2013

(65) Prior Publication Data
US 2014/0356730 A1    Dec. 4, 2014

(30) Foreign Application Priority Data
Nov. 29, 2011    (JP) ................... 2011-260197

(51) Int. Cl.
| | |
|---|---|
| H01M 2/16 | (2006.01) |
| H01M 2/14 | (2006.01) |
| C08J 5/18 | (2006.01) |
| B29C 71/02 | (2006.01) |
| B29C 48/00 | (2019.01) |
| B29K 23/00 | (2006.01) |
| B29L 31/34 | (2006.01) |
| B29L 31/00 | (2006.01) |
| H01M 10/0525 | (2010.01) |

(52) U.S. Cl.
CPC ....... *H01M 2/1653* (2013.01); *B29C 48/0018* (2019.02); *B29C 48/022* (2019.02); *C08J 5/18* (2013.01); *C08J 7/08* (2013.01); *H01M 2/145* (2013.01); *B29K 2023/12* (2013.01); *B29L 2031/3468* (2013.01); *B29L 2031/755* (2013.01); *C08J 2323/12* (2013.01); *H01M 10/0525* (2013.01)

(58) Field of Classification Search
CPC .................................................. H01M 2/1653
See application file for complete search history.

(56) References Cited

U.S. PATENT DOCUMENTS

| | | | |
|---|---|---|---|
| 2006/0103055 A1* | 5/2006 | Hoshuyama | B01D 67/0027 264/479 |
| 2007/0178324 A1* | 8/2007 | Masuda | B29C 47/0021 428/500 |
| 2008/0124623 A1* | 5/2008 | Hisamitsu | H01M 4/13 429/156 |
| 2009/0117454 A1 | 5/2009 | Takita et al. | |
| 2009/0226814 A1* | 9/2009 | Takita | B01D 67/0027 429/247 |
| 2011/0166243 A1 | 7/2011 | Kikuchi et al. | |

FOREIGN PATENT DOCUMENTS

| | | |
|---|---|---|
| CN | 101999183 | 3/2011 |
| CN | 102105517 | 6/2011 |
| EP | 1 905 586 | 4/2008 |
| EP | 2 111 914 | 10/2009 |
| EP | 2 333 876 | 6/2011 |
| JP | 63-199742 | 8/1988 |
| JP | 10-100344 | 4/1998 |
| JP | 2007-273443 | 10/2007 |
| JP | 2011-137159 | 7/2011 |
| TW | 201009001 | 3/2010 |

OTHER PUBLICATIONS

Chinese Office Action in corresponding Chinese Application No. 201280054424.
International Search Report dated Feb. 19, 2013 in International (PCT) Application No. PCT/JP2012/080274.
Extended European Search Report dated Aug. 17, 2015 in corresponding European Application No. 12853183.7.

* cited by examiner

*Primary Examiner* — Barbara L Gilliam
*Assistant Examiner* — Nathanael T Zemui
(74) *Attorney, Agent, or Firm* — Wenderoth, Lind & Ponack, L.L.P.

(57) ABSTRACT

The present invention provides a propylene-based resin microporous film which has excellent lithium ion permeability, can constitute a high-performance lithium ion battery, and can prevent a short circuit between a positive electrode and a negative electrode due to dendrites.

The propylene-based resin microporous film of the present invention is a propylene-based resin microporous film containing micropores, wherein the degree of gas permeability is 100 to 400 s/100 mL, the standard deviation of the degree of gas permeability is 7 s/100 mL or less, the thermal shrinkage ratio during heating at 105° C. for 2 hours is 6% or less, and the standard deviation of the thermal shrinkage ratio is 1% or less.

8 Claims, No Drawings

PROPYLENE-BASED RESIN MICROPOROUS FILM, SEPARATOR FOR BATTERY, BATTERY, AND METHOD FOR PRODUCING PROPYLENE-BASED RESIN MICROPOROUS FILM

FIELD

The present invention relates to a propylene-based resin microporous film, a separator for a battery, a battery, and a method for producing a propylene-based resin microporous film.

BACKGROUND

A lithium ion battery has been conventionally used as a power supply for a portable electronic apparatus. The lithium ion battery is generally configured by disposing a positive electrode, a negative electrode, and a separator in an electrolyte solution. In the positive electrode, lithium cobaltate or lithium manganate is applied to the surface of an aluminum foil. In the negative electrode, carbon is applied to the surface of a copper foil. The separator is disposed so as to separate the positive electrode and the negative electrode, to prevent a short circuit between the positive electrode and the negative electrode.

When the lithium ion battery is charged, lithium ions are released from the positive electrode and move to the negative electrode. In contrast, when the lithium ion battery is discharged, lithium ions are released from the negative electrode and move to the positive electrode. Such charge and discharge are repeated in the lithium ion battery. Therefore, it is necessary that the separator used in the lithium ion battery can allow lithium ions to well permeate there.

When the lithium ion battery is repeatedly charged and discharged, dendrites (dendrite crystals) of lithium are generated on the end surface of the negative electrode. The dendrites break through the separator to cause a very small short circuit (dendrite short circuit) between the positive electrode and the negative electrode, thereby remarkably deteriorating the battery capacity.

On the other hand, in order to improve the safety of the lithium ion battery, an olefinic resin porous film which mainly includes polyethylene is used as the separator. When the lithium ion battery generates abnormal heat due to a short circuit or the like, polyethylene constituting the porous film melts at about 130° C. to block a porous structure (shutdown function). In this manner, the abnormal heat of the lithium ion battery is stopped, and safety can be ensured.

In recent years, an increase in the output of a large-type battery such as a lithium ion battery for automobiles has proceeded. The temperature in the battery may be rapidly increased to higher than 130° C. For this reason, the shutdown function is not necessarily required for the separator for the lithium ion battery, and heat resistance is considered as an important factor. In order to increase the output of the lithium ion battery, a decrease in the resistance to permeation of lithium ions through the separator is required. Accordingly, it is necessary that the separator has high gas permeability. Further, it is important for the large-type lithium ion battery to ensure a long lifetime and long-term safety.

Various polypropylene porous films have been proposed as a separator having a high heat resistance. For example, Patent Literature 1 proposed a method for producing a polypropylene microporous film. The method includes extruding a composition containing polypropylene, a polymer having a melt crystallization temperature higher than that of polypropylene, and a β-crystal nucleating agent to mold the extruded composition into a sheet, and stretching the sheet at least uniaxially.

However, a polypropylene microporous film obtained by the method for producing a polypropylene microporous film has a low gas permeability and an insufficient lithium ion permeability. Therefore, it is difficult that such a polypropylene microporous film is used for the lithium ion battery requiring a high output.

Patent Literature 2 proposed a multilayered porous membrane which comprises a polyolefin resin porous membrane and a porous layer provided on at least one side of the polyolefin resin porous membrane, and has the degree of gas permeability of 1 to 650 sec./100 cc. The porous layer contains an inorganic filler or a resin having a melting point and/or a glass transition temperature of 180° C. or higher, and has a thickness of 0.2 μm to 100 μm. However, the multilayered porous membrane also has an insufficient lithium ion permeability, and therefore it is difficult that the multilayered porous membrane is used for the lithium ion battery requiring a high output.

In addition, Patent Literature 3 discloses a method for producing a polypropylene porous film, in which a polypropylene film is uniaxially stretched to form pores. However, in the polypropylene porous film obtained by the method of Patent Literature 3, pores are not uniformly formed. Therefore, the lithium ion permeability is not uniform. Accordingly, the polypropylene porous film includes a portion where the lithium ion permeability is high and a portion where the lithium ion permeability is low. Such a polypropylene porous film has disadvantages in which a very small short circuit is easily caused by the generation of dendrites in the portion where the lithium ion permeability is high and the long lifetime and the long-term safety are not sufficient.

CITATION LIST

Patent Literature

Patent Literature 1: Japanese Patent Application Laid-Open No. Sho. 63-199742
Patent Literature 2: Japanese Patent Application Laid-Open No. 2007-273443
Patent Literature 3: Japanese Patent Application Laid-Open No. Hei. 10-100344

SUMMARY

Technical Problem

The present invention provides a propylene-based resin microporous film which has excellent lithium ion permeability, is capable of producing a high-performance lithium ion battery, and is unlikely to cause a short circuit between a positive electrode and a negative electrode due to dendrites and a rapid decrease in discharge capacity even when the microporous film is used for an application of high output. It is another object of the invention to provide a method for producing the same.

Means for Solving Problem

[Propylene-based resin Microporous Film]
The propylene-based resin microporous film of the present invention is a propylene-based resin microporous film containing micropores, wherein the degree of gas permeability is 100 to 400 s/100 mL, the standard deviation of the degree of gas permeability is 7 s/100 mL or less, the thermal shrinkage ratio after heating at 105° C. for 2 hours is 6% or less, and the standard deviation of the thermal shrinkage ratio is 1% or less.

Examples of the propylene-based resin used for the propylene-based resin microporous film may include a propylene homopolymer and a copolymer of propylene and another olefin. The propylene-based resin may be used alone or in combination of two or more kinds thereof. The copolymer of propylene and another olefin may be any of a block copolymer and a random copolymer.

Examples of olefin copolymerizable with propylene may include $\alpha$-olefins such as ethylene, 1-butene, 1-pentene, 4-methyl-1-pentene, 1-hexene, 1-octene, 1-nonene, and 1-decene.

The weight average molecular weight of the propylene-based resin is preferably 250,000 to 500,000, and more preferably 280,000 to 480,000. When the weight average molecular weight of the propylene-based resin used is low, the micropores may be non-uniformly formed in the propylene-based resin microporous film. In contrast, when the weight average molecular weight of the propylene-based resin used is high, the formation of the film may be unstable, and the micropores may not be easily formed in the propylene-based resin microporous film.

The molecular weight distribution (weight average molecular weight Mw/number average molecular weight Mn) of the propylene-based resin is preferably 7.5 to 12.0, more preferably 8.0 to 11.5, and particularly preferably 8.0 to 11.0. When the molecular weight distribution of the propylene-based resin used is narrow, the surface aperture ratio of the propylene-based resin microporous film may deteriorate. In contrast, when the molecular weight distribution of the propylene-based resin used is wide, the mechanical strength of the propylene-based resin microporous film may deteriorate.

Here, the weight average molecular weight and the number average molecular weight of the propylene-based resin are values measured by a gel permeation chromatography (GPC) using polystyrene as a standard. Specifically, 6 to 7 mg of propylene-based resin is weighed. Subsequently, the weighted propylene-based resin is placed in a test tube. An o-dichlorobenzene (o-DCB) solution containing 0.05% by weight of dibutyl hydroxy toluene (BHT) is added to the test tube to dilute the propylene-based resin to a concentration of 1 mg/mL. Thus, a diluted solution is prepared.

The diluted solution is shaken using a device for dissolution and filtration at 145° C. and a revolution speed of 25 rpm over 1 hour to dissolve the propylene-based resin in the o-DCB solution. Thus, a sample for measurement is obtained. The weight average molecular weight and the number average molecular weight of the propylene-based resin can be measured by GPC using the sample for measurement.

The weight average molecular weight and the number average molecular weight of the propylene-based resin can be measured, for example, by the following measurement device under the following measurement conditions.

<Measurement Device>
Trade name "HLC-8121GPC/HT" manufactured by TOSOH Corporation
<Measurement Conditions>
Column: TSKgelGMHHR-H(20)HT×3
 TSKguardcolumn-HHR(30)HT×1
Mobile phase: o-DCB 1.0 mL/min
Sample concentration: 1 mg/mL
Detector: Blythe type refractometer
Standard substance: polystyrene (available from TOSOH Corporation, molecular weight: 500 to 8,420,000)
Elution condition: 145° C.
SEC temperature: 145° C.

The melting point of the propylene-based resin is preferably 160 to 170° C., and more preferably 160 to 165° C. When the melting point of the propylene-based resin used is low, the mechanical strength of the propylene-based resin microporous film at high temperatures may deteriorate. In contrast, when the melting point of the propylene-based resin used is high, the formation of the film may be unstable.

It is preferable that the micropores in the propylene-based resin microporous film of the present invention be formed by uniaxially stretching a propylene-based resin film including the above-described propylene-based resin.

The degree of gas permeability of the propylene-based resin microporous film is limited to 100 to 400 s/100 mL, and preferably 100 to 320 s/100 mL. When the degree of gas permeability of the propylene-based resin microporous film is high, the lithium ion permeability deteriorates. Therefore, the battery performance of a lithium ion battery may deteriorate. In contrast, when the degree of gas permeability is low, the mechanical strength of the propylene-based resin microporous film may deteriorate.

The standard deviation of the degree of gas permeability of the propylene-based resin microporous film is limited to 7 s/100 mL or less, preferably 5 s/100 mL or less, and more preferably 3 s/100 mL or less. When the standard deviation of the degree of gas permeability of the propylene-based resin microporous film is more than 7 s/100 mL, the lithium ion permeability may not be uniform. In this case, a portion where the lithium ion permeability is high is locally formed in the propylene-based resin microporous film, and dendrites are generated to break through the propylene-based resin microporous film. As a result, the occurrence of dendrite short circuit in a lithium ion battery and a decrease in the mechanical strength of the propylene-based resin microporous film are easily caused.

The standard deviation of the degree of gas permeability of the propylene-based resin microporous film is preferably 0.01 s/100 mL, more preferably 0.1 s/100 mL or more, and particularly preferably 1 s/100 mL or more. In order to produce a propylene-based resin microporous film having a standard deviation of degree of gas permeability less than 0.01, it is necessary to use a heating device having a high control function (for example, hot blast furnace) in an aging step. However, the use of such a device is undesirable from an economic point of view.

The degree of gas permeability of the propylene-based resin microporous film can be measured as follows. Any point in the propylene-based resin microporous film is defined as a starting point, and a measurement range is between the starting point and a position 3 m away from the starting point in the longitudinal direction of the propylene-based resin microporous film. Next, the degree of gas permeability of the propylene-based resin microporous film is measured at intervals of 10 cm in the longitudinal direction of the propylene-based resin microporous film from the starting point of the measurement range under an atmosphere of temperature of 23° C. and relative humidity of 65% in accordance with JIS P8117. The arithmetic average thereof is defined as the degree of gas permeability (s/100 mL) of the propylene-based resin microporous film.

The standard deviation of the degree of gas permeability of the propylene-based resin microporous film is a value calculated on the basis of all the degrees of gas permeability of the propylene-based resin microporous film that are measured in the same manner as described above.

The thermal shrinkage ratio of the propylene-based resin microporous film is limited to 6% or less, and preferably 4% or less. When the temperature of a lithium ion battery including a propylene-based resin microporous film having a thermal shrinkage ratio more than 6% becomes high, the propylene-based resin microporous film may be thermally shrunk to cause an internal short circuit in which a positive electrode comes into contact with a negative electrode.

The thermal shrinkage ratio of the propylene-based resin microporous film is preferably 0.01% or more, and more preferably 0.05% or more. In the production of a propylene-based resin microporous film having a thermal shrinkage ratio less than 0.01%, it is necessary to perform the annealing step at high temperatures for an extended period. However, the execution of such a step is undesirable from an economic point of view.

The standard deviation of the thermal shrinkage ratio of the propylene-based resin microporous film is limited to 1% or less, preferably 0.5% or less, and more preferably 0.3% or less. When the temperature of a lithium ion battery including a propylene-based resin microporous film having a standard deviation of a thermal shrinkage ratio more than 1% becomes high, the propylene-based resin microporous film may be thermally shrunk in a non-uniform manner to make the lithium ion permeability non-uniform. In this case, a portion where the lithium ion permeability is high is locally formed, and dendrites are generated to break through the propylene-based resin microporous film. As a result, the occurrence of dendrite short circuit in the lithium ion battery and a decrease in the mechanical strength of the propylene-based resin microporous film are easily caused.

The standard deviation of the thermal shrinkage ratio of the propylene-based resin microporous film is preferably. 0.01% or more, and more preferably 0.05% or more. In the production of a propylene-based resin microporous film having a standard deviation of a thermal shrinkage ratio less than 0.01%, it is necessary to use a heating device having a high control function (for example, hot blast furnace) in the aging step. However, the use of such a device is undesirable from an economic point of view.

The thermal shrinkage ratio of the propylene-based resin microporous film can be measured as follows. Any part of the propylene-based resin microporous film is first cut into a band piece with a width of 2 cm and a length of 300 cm. At this time, the longitudinal direction (extrusion direction) of the propylene-based resin microporous film is set to the longitudinal direction of the band piece. The band piece is cut at intervals of 10 cm in the longitudinal direction to obtain 30 specimens having a planar rectangular shape with a short side of 2 cm and a long side of 10 cm. A base line with a length of 8 cm is drawn on a straight virtual line that connects a middle point in one short side direction of each of the specimens and a middle point of the other short side, direction of each of the specimens. The specimens are then allowed to stand under a standard atmosphere class 2 (temperature: 23±5° C., relative humidity: 50±3%) defined by JIS K7100 for 30 minutes. Subsequently, the length ($L_o$ (mm)) of the base line on each of the specimens is measured to two decimal places by a vernier caliper in accordance with JIS B7507. The specimens are then disposed in a thermostatic oven at an internal temperature of 105° C. so as to be vertically suspended with the direction of long side thereof vertical, and heated for 2 hours. The specimens are allowed to stand under the standard atmosphere class 2 (temperature: 23±5° C., relative humidity: 50±3%) defined by JIS K7100 for 30 minutes. The length ($L_1$ (mm)) of the base line on each of the specimens is then measured to two decimal places by a vernier caliper in accordance with JIS B7507. The thermal shrinkage ratio (%) is calculated by the following equation. The thermal shrinkage ratios of the 30 specimens are each measured by the same procedure as described above. The arithmetic average thereof is defined as the thermal shrinkage ratio (%) of the propylene-based resin microporous film.

Thermal shrinkage ratio (%)=[($L_0$−$L_1$)×100]/$L_0$

The standard deviation of the thermal shrinkage ratio of the propylene-based resin microporous film is a value calculated on the basis of all the thermal shrinkage ratios of the 30 specimens produced from the propylene-based resin microporous film that are each measured in the same manner as that described above.

The surface aperture ratio of the propylene-based resin microporous film is preferably 25 to 55%, and more preferably 30 to 50%. When the surface aperture ratio of the propylene-based resin microporous film is low, the gas permeability may be low. When the surface aperture ratio of the propylene-based resin microporous film is high, the mechanical strength may be low.

The surface aperture ratio of the propylene-based resin microporous film can be measured as follows. A measurement part of planar rectangular shape with a width of 9.6 µm and a length of 12.8 µm is first determined in any part of the surface of the propylene-based resin microporous film, and photographed at a magnification of 10,000.

Each micropore formed in the measurement part is then surrounded by a rectangle. The rectangle is adjusted so that both the long and short sides are the shortest. The area of the rectangle is considered as the aperture area of each micropore. The total aperture area S ($\mu m^2$) of the micropores is calculated by adding the aperture area of each micropore together. The total aperture area S ($\mu m^2$) of the micropores is divided by 122.88 $\mu m^2$ (9.6 µm×12.8 µm) and then multiplied by 100 to calculate a surface aperture ratio (%). For a micropore that exists over a measurement part and a non-measurement part, only a part of the micropore that exists within the measurement part is considered as a subject to be measured.

The longest diameter of the aperture edges of the micropores in the propylene-based resin microporous film is preferably 1 µm or smaller, and more preferably 100 nm to 900 nm. In a propylene-based resin microporous film containing micropores of which the longest diameter of the aperture edges is large, a dendrite short circuit caused by local movement of lithium ions may occur, and the mechanical strength may deteriorate.

The average longer diameter of the aperture edges of the micropores in the propylene-based resin microporous film is preferably 500 nm or smaller, and more preferably 10 nm to 400 nm. In a propylene-based resin microporous film containing micropores of which the average longer diameter of aperture edges is long, a dendrite short circuit may occur.

The longest diameter and average longer diameter of the aperture edges of the micropores in the propylene-based resin microporous film are measured as follows. The surface of the propylene-based resin microporous film is first carbon-coated. Any ten portions in the surface of the propylene-based resin microporous film are photographed by a scanning electron microscope at a magnification of 10,000. A photographed region is a region of planar rectangular shape with a width of 9.6 µm and a length of 12.8 µm in the surface of the propylene-based resin microporous film.

The longer diameter of the aperture edge of each of the micropores in the photograph is measured. Of the longer diameters of the aperture edges of the micropores, the longest diameter is defined as a longest diameter of the aperture edges of the micropores. The arithmetic average of the longer diameters of the aperture edges of the micropores is defined as an average longer diameter of the aperture edges of the micropores. The longer diameter of the aperture edge of each of the micropores is a diameter of a perfect circle with the shortest diameter in which the aperture edge of the micropore can be surrounded. A micropore that exists over the photographing region and a non-photographing region is excluded from the subject to be measured.

The pore density of the propylene-based resin microporous film is preferably 15 pores/$\mu m^2$ or more, and more preferably 17 pores/$\mu m^2$ or more. When the pore density of the propylene-based resin microporous film is 15 pores/$\mu m^2$ or more, a dendrite short circuit is unlikely to occur.

The pore density of the propylene-based resin microporous film is preferably 1,000 pores/$\mu m^2$ or less, and more preferably 500 pores/$\mu m^2$ or less. When the pore density of the propylene-based resin microporous film is too high, the mechanical strength may deteriorate.

The pore density of the propylene-based resin microporous film is measured as follows. A measurement part of planar rectangular shape with a width of 9.6 $\mu m$ and a length of 12.8 $\mu m$ is first determined in any part of the surface of the propylene-based resin microporous film, and photographed at a magnification of 10,000. The number of the micropores in the measurement part is counted, and the number is divided by 122.88 $\mu m^2$ (9.6 $\mu m \times 12.8$ $\mu m$) to calculate the pore density.

The propylene-based resin microporous film of the present invention uniformly contains a large number of micropores that penetrate through the front and back surfaces of the film. Therefore, the propylene-based resin microporous film has excellent and uniform gas permeability. Such a propylene-based resin microporous film can allow ions such as lithium ions, sodium ions, calcium ions, and magnesium ions to pass therethrough smoothly and uniformly. Accordingly, the propylene-based resin microporous film is useful as a separator for a battery.

In addition to the lithium ion battery, examples of the battery in which the propylene-based resin microporous film of the present invention can be used as a separator may include a nickel-hydrogen battery, a nickel-cadmium battery, a nickel-zinc battery, and a silver-zinc battery. Among them, a lithium ion battery is preferred. Using the propylene-based resin microporous film can provide a battery which highly decreases the generation of dendrites and stably exerts excellent battery performance, even when charge and discharge are performed at high current density.

[Method for Producing Propylene-Based Resin Microporous Film]

The propylene-based resin microporous film of the present invention can be produced by a method including:

an extrusion step of supplying a propylene-based resin to an extruder, melt-kneading the resin, and extruding the resin through a T die attached to the tip of the extruder to obtain a propylene-based resin film;

an aging step of winding the propylene-based resin film obtained in the extrusion step into a roll to obtain a propylene-based resin film roll, and aging the propylene-based resin film roll under an atmosphere where the temperature is equal to or higher than a temperature lower than the melting point of the propylene-based resin by 30° C. and equal to or lower than a temperature lower than the melting point of the propylene-based resin by 1° C. for 1 hour or longer while the propylene-based resin film roll is rotated in a circumferential direction;

a stretching step of unwinding the propylene-based resin film from the propylene-based resin film roll after the aging step, and uniaxially stretching the propylene-based resin film; and an annealing step of annealing the propylene-based resin film after the stretching step. The method for producing the propylene-based resin microporous film of the present invention will be described below in due order.

(Extrusion Step)

The extrusion step is first performed as follows. A propylene-based resin is first supplied to an extruder, melt-kneaded, and extruded through a T die attached to the tip of the extruder to obtain a propylene-based resin film.

The temperature of the propylene-based resin during melt-kneading the propylene-based resin in the extruder is preferably equal to or higher than a temperature higher than the melting point of the propylene-based resin by 20° C. and equal to or lower than a temperature higher than the melting point of the propylene-based resin by 100° C., and more preferably equal to or higher than a temperature higher than the melting point of the propylene-based resin by 25° C. and equal to or lower than a temperature higher than the melting point of the propylene-based resin by 80° C. When the temperature of the propylene-based resin is low, the thickness of the obtained propylene-based resin microporous film may not be made uniform or the surface smoothness of the propylene-based resin microporous film may deteriorate. When the temperature of the propylene-based resin is high, the orientation of the propylene-based resin may deteriorate, resulting in no formation of lamellae in the propylene-based resin.

The draw ratio during extrusion of the propylene-based resin through the extruder into a film is preferably 50 to 300, more preferably 65 to 250, and particularly preferably 70 to 250. When the draw ratio is low, the molecular orientation of the propylene-based resin is insufficient, and lamellae may not be sufficiently formed in the propylene-based resin. When the draw ratio is high, the film-forming stability of the propylene-based resin film deteriorates. Therefore, the thickness precision and width precision of the obtained propylene-based resin film may deteriorate.

The draw ratio is a value obtained by dividing the clearance of a lip of a T die by the thickness of the propylene-based resin film extruded through the T die. The clearance of the lip of the T die can be measured as follows. The clearance of the lip of the T die is measured at 10 or more portions using a feeler gauge (for example, JIS feeler gauge manufactured by NAGAI GAUGES) in accordance with JIS B7524, and the arithmetic average thereof is calculated. Further, the thickness of the propylene-based resin film extruded through the T die can be measured as follows. The thickness of the propylene-based resin film extruded through the T die is measured at 10 or more portions using a dial gauge (for example, Signal ABS Digimatic Indicator manufactured by Mitutoyo Corporation), and the arithmetic average thereof is calculated.

The film-forming rate of the propylene-based resin film is preferably 10 to 300 m/min, more preferably 15 to 250 m/min, and particularly preferably 15 to 30 m/min. When the film-forming rate of the propylene-based resin film is low, the molecular orientation of the propylene-based resin is insufficient, and lamellae may not be sufficiently formed in the propylene-based resin. When the film-forming rate of the propylene-based resin film is high, the film-forming stability of the propylene-based resin film deteriorates. Therefore, the thickness precision and width precision of the obtained propylene-based resin film may deteriorate.

It is preferable that the propylene-based resin film extruded through the T die be cooled until the surface temperature thereof is equal to or lower than a temperature lower than the melting point of the propylene-based resin by 100° C. This promotes crystallization of the propylene-based resin to form lamellae. In the present invention, a melt-kneaded propylene-based resin is extruded to orient the molecule of the propylene-based resin constituting the propylene-based resin film in advance. The propylene-based resin film can be then cooled to promote the formation of lamellae in a portion where the propylene-based resin is oriented.

The surface temperature of the cooled propylene-based resin film is preferably equal to or lower than a temperature lower than the melting point of the propylene-based resin by 100° C., more preferably a temperature that is lower than the melting point of the propylene-based resin by 140 to 110° C., and particularly preferably a temperature that is lower than the melting point of the propylene-based resin by 135 to 120° C. When the surface temperature of the cooled propylene-based resin film is high, lamellae may not be sufficiently formed in the propylene-based resin constituting the propylene-based resin film.

(Aging Step)

Subsequently, the propylene-based resin film obtained in the extrusion step is aged. The aging step of the propylene-based resin film is performed to grow lamellae formed in the propylene-based resin film in the extrusion step. Thus, crystallized portions (lamellae) and uncrystallized portions are arranged alternately in the extrusion direction of the propylene-based resin film to form a layered lamellar structure. In the stretching step of the propylene-based resin film as described below, a crack is generated not within the lamellae but between the lamellae. Starting from the crack, a micro through pore (micropore) can be formed.

In the method of the present invention, the propylene-based resin film is aged as follows. The propylene-based resin film obtained in the extrusion step is wound into a roll to obtain a propylene-based resin film roll, and the propylene-based resin film roll is placed for 1 hour or longer under an atmosphere where the temperature is equal to or higher than a temperature lower than the melting point of the propylene-based resin by 30° C. and equal to or lower than a temperature lower than the melting point of the propylene-based resin by 1° C. while the propylene-based resin film roll is rotated in a circumferential direction.

The propylene-based resin film roll obtained by winding the propylene-based resin film into a roll is generally aged by placing it in a heating device such as a heating furnace and a hot blast furnace for a predetermined time. However, unevennesses in the temperature and gas flow rate of hot air are likely to be caused in the heating device. If the propylene-based resin film roll is aged without rotation, the propylene-based resin film in the propylene-based resin film roll may not be aged at uniform temperature, and lamellae formed in the propylene-based resin film in the extrusion step may not be uniformly grown. As a result, the thickness, degree of gas permeability, and thermal shrinkage ratio of the obtained propylene-based resin microporous film may be made non-uniform.

If the propylene-based resin film roll is aged without rotation, the propylene-based resin films in the propylene-based resin film roll are partially attached to each other, and blocking is likely to occur locally. If the propylene-based resin film roll is aged without rotation while the axis core direction thereof is maintained horizontal, a small gap is formed between the propylene-based resin films at the lower side of the propylene-based resin film roll because the propylene-based resin film in the propylene-based resin film roll sags downward under its own weight. On the other hand, the propylene-based resin films are attached to each other at the upper side of the propylene-based resin film roll and blocking is likely to occur. If such blocking occurs, a portion where the propylene-based resin films are attached to each other is unlikely to be peeled during unwinding the propylene-based resin film from the propylene-based resin film roll. Further, when the portion where the propylene-based resin films are attached is peeled forcedly, the propylene-based resin film locally stretches to cause local residual strain. Even when the propylene-based resin film having such local residual strain is uniaxially stretched to produce a propylene-based resin microporous film, not only the thermal shrinkage ratio of the propylene-based resin microporous film but also the degree of gas permeability and the variation of thermal shrinkage ratio increase.

However, in the method of the present invention, the propylene-based resin film is aged while the propylene based resin film roll is rotated in the circumferential direction with the axis core thereof as a center. As a result, even if unevennesses in the temperature and gas flow rate of hot air may be caused in the heating device, the temperatures from the surface to the inside of the propylene-based resin film roll are entirely made uniform. Therefore, the propylene-based resin film in the propylene-based resin film roll is aged at uniform temperature to uniformly grow lamellae in the propylene-based resin film. Moreover, in the method of the present invention, the occurrence of local blocking in the aging step as described above can be highly decreased. Therefore, according to the method of the present invention, a propylene-based resin microporous film having uniform thickness, degree of gas permeability, and thermal shrinkage ratio can be produced.

In the aging step, it is preferable that the propylene-based resin film roll be aged with rotation in the circumferential direction while the axis core direction thereof is maintained horizontal. When the propylene-based resin film roll is rotated while the axis core thereof is maintained in the horizontal direction as described above, the occurrence of blocking in the propylene-based resin film roll in the aging step can be more highly decreased.

In the present invention, the term "horizontality" means "substantial horizontality". The horizontality includes a state in which the axis core direction of the propylene-based resin film roll falls within a range of −5° to +5° with respect to a horizontal surface.

The aging temperature of the propylene-based resin film roll is limited to a temperature that is equal to or higher than a temperature lower than the melting point of the propylene-based resin by 30° C. and equal to or lower than a temperature lower than the melting point of the propylene-based resin by 1° C., and preferably a temperature that is equal to or higher than a temperature lower than the melting point of the propylene-based resin by 25° C. and equal to or lower than a temperature lower than the melting point of the propylene-based resin by 5° C. When the aging temperature of the propylene-based resin film roll is low, lamellae may not be sufficiently grown. When the aging temperature of the propylene-based resin film roll is high, the molecular orientation of the propylene-based resin may be relaxed to break lamellae.

The aging temperature of the propylene-based resin film roll is a temperature under an atmosphere where the propylene-based resin film roll is placed. Therefore, when the propylene-based resin film roll is aged, for example, in a heating device such as a hot blast furnace, a temperature under an atmosphere where the propylene-based resin film is placed in the heating device is defined as the aging temperature.

The aging time of the propylene-based resin film roll is limited to 1 hour or longer, preferably 4 hours or longer, and more preferably 15 hours or longer. When the propylene-based resin film roll is aged for 1 hour or longer, the propylene-based resin film can be sufficiently aged while the temperatures from the surface to the inside of the propylene-based resin film roll are entirely maintained to the above-described aging temperature. Further, lamellae in the propylene-based resin film can be sufficiently and uniformly grown. When the aging time is too long, the propylene-based resin film may be thermally degraded. Therefore, the aging time is preferably 35 hours or shorter, and more preferably 30 hours or shorter.

The rotation speed of the propylene-based resin film roll in the aging step is preferably 0.05 to 70 rpm, and more preferably 0.1 to 50 rpm. When the rotation speed of the propylene-based resin film roll is too low, an effect that can result from aging of the propylene-based resin film roll with rotation may not be sufficient. Even when the propylene-based resin film roll is rotated at a rotation speed more than 70 rpm, an effect corresponding to an increase in the rotation speed may not be obtained.

(Stretching Step)

Next, the stretching step is performed by unwinding the propylene-based resin film from the propylene-based resin film roll after the aging step, and uniaxially stretching it. It is preferable that the stretching step include a first stretching step and a second stretching step subsequent to the first stretching step. In the first stretching step, the propylene-based resin film is uniaxially stretched preferably only in the extrusion direction.

In the first stretching step, lamellae in the propylene-based resin film are hardly molten. The lamellae are separated from each other by stretching to independently form fine cracks with efficiency in an uncrystallized portion between the lamellae. Starting from the cracks, many micropores are formed with reliability.

The surface temperature of the propylene-based resin film in the first stretching step is preferably −20 to 100° C., and more preferably 0 to 80° C. When the surface temperature is low, the propylene-based resin film may be ruptured during stretching. When the surface temperature is high, a crack is unlikely to be generated in the uncrystallized portion between the lamellae.

The stretching ratio of the propylene-based resin film in the first stretching step is preferably 1.05 to 2 times, and more preferably 1.1 to 1.8 times. When the stretching ratio is low, the micropores are unlikely to be formed in the uncrystallized portion between the lamellae. When the stretching ratio is high, the micropores may not be uniformly formed in the propylene-based resin microporous film.

In the present invention, the stretching ratio of the propylene-based resin film is a value obtained by dividing the length of a propylene-based resin film after stretching by the length of the propylene-based resin film before stretching.

The stretching rate of the propylene-based resin film in the first stretching step is preferably 20%/min or more. When the stretching ratio is low, the micropores are unlikely to be uniformly formed in the uncrystallized portion between the lamellae. When the stretching ratio is too high, the propylene-based resin film may be ruptured. Therefore, the stretching rate of the propylene-based resin film in the first stretching step is preferably 20 to 3,000%/min, and more preferably 20 to 70%/min.

In the present invention, the stretching rate of the propylene-based resin film is a rate of change in the dimension of the propylene-based resin film in the stretching direction thereof per unit time.

A method of stretching a propylene-based resin film in the first stretching step is not particularly limited as long as the propylene-based resin film can be uniaxially stretched. Examples thereof may include a method of uniaxially stretching a propylene-based resin film at a predetermined temperature using a uniaxial stretching device.

It is preferable to perform a second stretching step. In the second stretching step, it is preferred that the propylene-based resin film stretched in the first stretching step be stretched at a surface temperature that is higher than the surface temperature of the propylene-based resin film in the first stretching step and equal to or lower than a temperature lower than the melting point of the propylene-based resin by 10 to 100° C., and a stretching ratio of 1.05 to 3 times. In the second stretching step, the propylene-based resin film is uniaxially stretched preferably only in the extrusion direction. As described above, the propylene-based resin film is stretched in the same direction as in the first stretching step at a surface temperature that is higher than the surface temperature of the propylene-based resin film in the first stretching step. Thus, many micropores formed in the propylene-based resin film during the first stretching step can be grown.

In the second stretching step, the surface temperature of the propylene-based resin film is preferably higher than the surface temperature of the propylene-based resin film in the first stretching step and equal to or lower than a temperature lower than the melting point of the propylene-based resin by 10 to 100° C., and more preferably higher than the surface temperature of the propylene-based resin film in the first stretching step and equal to or lower than a temperature lower than the melting point of the propylene-based resin by 15 to 80° C. When the surface temperature is low, the micropores formed in the propylene-based resin film in the first stretching step are unlikely to be grown, and the gas permeability of the propylene-based resin microporous film may not be improved. When the surface temperature is high, the micropores formed in the propylene-based resin film in the first stretching step are blocked, and the gas permeability of the propylene-based resin microporous film may deteriorate.

In the second stretching step, the stretching ratio of the propylene-based resin film is preferably 1.05 to 3 times, and more preferably 1.8 to 2.5 times. When the stretching ratio is low, the micropores formed in the propylene-based resin film in the first stretching step are unlikely to be grown, and the gas permeability of the propylene-based resin microporous film may deteriorate. When the stretching ratio is high, the micropores formed in the propylene-based resin film in the first stretching step may be blocked, and the gas permeability of the propylene-based resin microporous film may deteriorate.

In the second stretching step, the stretching rate of the propylene-based resin film is preferably 500%/min or less, more preferably 400%/min or less, and particularly preferably 60%/min or less. When the stretching rate is high, the micropores may not be uniformly formed in the propylene-based resin film. When the stretching rate is low, the micropores are unlikely to be uniformly formed in the uncrystallized portion between the lamellae. Therefore, the stretching rate of the propylene-based resin film in the second stretching step is preferably 15%/min or more.

A method of stretching a propylene-based resin film in the second stretching step is not particularly limited as long as the propylene-based resin film can be uniaxially stretched. Examples thereof may include a method of uniaxially stretching a propylene-based resin film at a predetermined temperature using a uniaxial stretching device.

(Annealing Step)

Next, the annealing step of annealing the propylene-based resin film after the stretching step is performed. In the annealing step, the residual strain in the propylene-based resin film caused by stretching in the stretching step is relaxed to suppress the occurrence of thermal shrinkage of the obtained propylene-based resin microporous film due to heating.

In the annealing step, the surface temperature of the propylene-based resin film is preferably equal to or higher than the surface temperature of the propylene-based resin film in the second stretching step and equal to or lower than a temperature lower than the melting point of the propylene-based resin by 10° C. When the surface temperature is low, the strain remained in the propylene-based resin film is not sufficiently relaxed, and the dimensional stability under heat of the obtained propylene-based resin microporous film may deteriorate. When the surface temperature is high, the micropores formed in the stretching step may be blocked.

The shrinkage ratio of the propylene-based resin film in the annealing step is preferably 30% or less. When the shrinkage ratio is high, the propylene-based resin film may sag, and not be uniformly annealed, or the shape of the micropores may not be maintained.

The shrinkage ratio of the propylene-based resin film is a value obtained by dividing the length of shrinkage of the propylene-based resin film in the stretching direction during the annealing step by the length of the propylene-based resin film in the stretching direction after the stretching step and multiplying the resultant by 100.

Advantageous Effects of Invention

The propylene-based resin microporous film of the present invention comprises many micropores uniformly formed so as to penetrate through the front and back surfaces of the film, and has excellent gas permeability and a small variation of gas permeability. Therefore, lithium ions can pass through such a propylene-based resin microporous film smoothly and uniformly. For example, when the propylene-based resin microporous film is used as a separator for a lithium ion battery, lithium ions can pass through the propylene-based resin microporous film smoothly and uniformly. Thus, a lithium ion battery in which the generation of dendrites can be highly decreased and excellent battery performance can be stably exerted can be provided.

Further, the propylene-based resin microporous film has a low thermal shrinkage ratio and a small variation of thermal shrinkage ratio. Therefore, using the propylene-based resin microporous film provides a lithium ion battery in which the thermal shrinkage of the propylene-based resin microporous film is highly decreased, the occurrence of short circuit between a positive electrode and a negative electrode is highly suppressed, and excellent battery performance is stably exerted, even when the temperature of the lithium ion battery becomes, for example, a high temperature of 103° C. or higher during charge and discharge of the lithium ion battery at high current density.

According to the method for producing a propylene-based resin microporous film of the present invention, the above-described propylene-based resin microporous film can be easily produced.

DESCRIPTION OF EMBODIMENTS

Hereinafter, Examples of the present invention will be described. The present invention is not limited to the Examples.

EXAMPLES 1 to 13, and COMPARATIVE EXAMPLE 6

(Extrusion Step)

A homopolypropylene having the weight average molecular weight, the number average molecular weight, and the melting point, which are shown in Tables 1 and 2, was supplied to an extruder, melt-kneaded at the resin temperature shown in Tables 1 and 2, extruded through a T die attached to the tip of the extruder into a film, and cooled to a surface temperature of 30° C. to obtain an elongated homopolypropylene film having a thickness of 30 μm and a width of 200 mm. The extruded rate was 12 kg/hr., the film-forming rate was 22 m/min., and the draw ratio was 70.

(Aging Step)

Next, a cylindrical core body with an outer diameter of 97 mm was prepared. The elongated homopolypropylene film (length: 400 m) was wound into a roll around the core body by rotating the core body in the circumferential direction with the axis core as a center. Thus, a homopolypropylene film roll was obtained. The homopolypropylene film roll was allowed to stand in a hot blast furnace at the atmospheric temperature, shown in Tables 1 and 2, of a place where the homopolypropylene film roll was placed over 24 hours while being rotated at a rotation speed shown in Tables 1 and 2 in the circumferential direction with the axis core of the core body as a center and with the axis core direction maintained horizontal. Thus, the homopolypropylene film roll was aged. At this time, the temperature of the homopolypropylene film from the surface to the inside of the homopolypropylene film roll was entirely the same as the temperature in the hot blast furnace. The atmospheric temperature of the place where the homopolypropylene film roll was placed in the hot blast furnace is described in the column of "Aging temperature" in Tables 1 and 2.

(First Stretching Step)

Then, the homopolypropylene film was continuously unwound from the aged homopolypropylene film roll at an unwinding rate of 0.5 m/min. The homopolypropylene film was uniaxially stretched using a uniaxial stretching device at a surface temperature of 23° C., a stretching rate of 50%/min and a stretching ratio shown in Tables 1 and 2 only in an extrusion direction.

(Second Stretching Step)

Subsequently, the homopolypropylene film was uniaxially stretched at a surface temperature of 120° C., a stretching rate of 42%/min and a stretching ratio shown in Tables 1 and 2 only in the extrusion direction using a uniaxial stretching device so that the surface temperature was 120° C.

(Annealing Step)

After that, the homopolypropylene film was supplied to a hot blast furnace. The homopolypropylene film was allowed to travel over 1 minute so that the surface temperature thereof was 130° C. and a tension was not applied to the homopolypropylene film, and thus annealed to obtain an elongated homopropylene microporous film having a thickness of 25 μm. The shrinkage ratios of the homopolypropylene film in the annealing step were set to the values shown in Tables 1 and 2.

COMPARATIVE EXAMPLE 1

A homopropylene microporous film was obtained in the same manner as in Example 1 except that the homopolypropylene film roll was aged without rotation in the aging step.

COMPARATIVE EXAMPLES 2 to 5

A homopropylene microporous film was obtained in the same manner as in Example 1 except that the resin temperature during melt-kneading the homopolypropylene by the extruder in the extrusion step, the aging temperature in the aging step, the stretching ratios in the first and second stretching steps, and the shrinkage ratio of the homopolypropylene film in the annealing step were each changed as shown in Table 2 and the homopolypropylene film roll was aged without rotation in the aging step.

[Evaluation]

The degree of gas permeability, the standard deviation thereof, the thermal shrinkage ratio, the standard deviation thereof, the longest diameter and the average longer diameter of the aperture edges of the micropores, the pore density, and the surface aperture ratio of the obtained homopolypropylene microporous films were measured as described above. The results are shown in Tables 1 and 2.

TABLE 1

|  |  | EXAMPLE 1 | EXAMPLE 2 | EXAMPLE 3 | EXAMPLE 4 | EXAMPLE 5 |
|---|---|---|---|---|---|---|
| HOMOPOLYPROPYLENE | WEIGHT AVERAGE MOLECULAR WEIGHT Mw | 413000 | 413000 | 413000 | 413000 | 413000 |
|  | NUMBER AVERAGE MOLECULAR WEIGHT Mn | 44300 | 44300 | 44300 | 44300 | 44300 |
|  | MOLECULAR WEIGHT DISTRIBUTION (Mw/Mn) | 9.3 | 93 | 9.3 | 9.3 | 9.3 |
|  | MELTING POINT (° C.) | 163 | 163 | 163 | 163 | 163 |
| EXTRUSION STEP | RESIN TEMPERATURE (° C.) | 200 | 200 | 190 | 200 | 200 |
| AGING STEP | AGING TEMPERATURE (° C.) | 155 | 155 | 158 | 146 | 146 |
|  | AGING TIME (HOUR) | 24 | 24 | 24 | 24 | 24 |
|  | ROTATION SPEED (rpm) | 0.1 | 50 | 0.1 | 0.1 | 0.1 |
| FIRST STRETCHING STEP | STRETCHING RATIO (TIME) | 1.2 | 1.2 | 1.2 | 1.2 | 1.2 |
| SECOND STRETCHING STEP | STRETCHING RATIO (TIME) | 2.0 | 2.0 | 2.0 | 2.0 | 2.2 |
| ANNEALING STEP | SHRINKAGE RATIO (%) | 5 | 5 | 5 | 5 | 5 |
| HOMOPOLYPROPYLENE MICROPOROUS FILM | DEGREE OF GAS PERMEABILITY (s/100 ml) | 180 | 185 | 102 | 316 | 387 |
|  | STANDARD DEVIATION OF DEGREE OF GAS PERMEABILITY (s/100 ml) | 2.8 | 1.0 | 2.3 | 4.1 | 4.6 |
|  | THERMAL SHRINKAGE RATIO (%) | 3.5 | 3.3 | 5.6 | 2.1 | 2.5 |
|  | STANDARD DEVIATION OF THERMAL SHRINKAGE RATIO (%) | 0.12 | 0.05 | 0.30 | 0.20 | 0.30 |
|  | LONGEST DIAMETER (nm) | 620 | 550 | 800 | 460 | 490 |
|  | AVERAGE LONGER DIAMETER (nm) | 360 | 320 | 460 | 270 | 280 |
|  | PORE DENSITY (PORE/μm$^2$) | 25 | 30 | 32 | 19 | 20 |
|  | SURFACE APERTURE RATIO (%) | 36 | 34 | 51 | 30 | 31 |

|  |  | EXAMPLE 6 | EXAMPLE 7 | EXAMPLE 8 | EXAMPLE 9 | EXAMPLE 10 |
|---|---|---|---|---|---|---|
| HOMOPOLYPROPYLENE | WEIGHT AVERAGE MOLECULAR WEIGHT Mw | 413000 | 413000 | 413000 | 413000 | 413000 |
|  | NUMBER AVERAGE MOLECULAR WEIGHT Mn | 44300 | 44300 | 44300 | 44300 | 44300 |
|  | MOLECULAR WEIGHT DISTRIBUTION (Mw/Mn) | 9.3 | 9.3 | 9.3 | 9.3 | 9.3 |
|  | MELTING POINT (° C.) | 163 | 163 | 163 | 163 | 163 |
| EXTRUSION STEP | RESIN TEMPERATURE (° C.) | 200 | 200 | 200 | 200 | 190 |
| AGING STEP | AGING TEMPERATURE (° C.) | 155 | 155 | 155 | 139 | 158 |
|  | AGING TIME (HOUR) | 4 | 24 | 4 | 24 | 24 |
|  | ROTATION SPEED (rpm) | 0.1 | 0.1 | 0.1 | 0.1 | 0.1 |
| FIRST STRETCHING STEP | STRETCHING RATIO (TIME) | 1.2 | 1.2 | 1.2 | 1.2 | 1.4 |
| SECOND STRETCHING STEP | STRETCHING RATIO (TIME) | 2.0 | 2.0 | 2.0 | 2.0 | 2.2 |
| ANNEALING STEP | SHRINKAGE RATIO (%) | 5 | 3 | 3 | 5 | 5 |
| HOMOPOLYPROPYLENE MICROPOROUS FILM | DEGREE OF GAS PERMEABILITY (s/100 ml) | 205 | 170 | 174 | 399 | 101 |
|  | STANDARD DEVIATION OF DEGREE OF GAS PERMEABILITY (s/100 ml) | 6.8 | 4.6 | 6.8 | 6.4 | 1.8 |
|  | THERMAL SHRINKAGE RATIO (%) | 2.9 | 6.0 | 5.5 | 1.9 | 5.7 |
|  | STANDARD DEVIATION OF THERMAL SHRINKAGE RATIO (%) | 0.50 | 0.50 | 0.90 | 0.25 | 029 |
|  | LONGEST DIAMETER (nm) | 630 | 760 | 750 | 420 | 900 |
|  | AVERAGE LONGER DIAMETER (nm) | 340 | 390 | 370 | 220 | 490 |
|  | PORE DENSITY (PORE/μm$^2$) | 24 | 25 | 26 | 20 | 32 |
|  | SURFACE APERTURE RATIO (%) | 33 | 39 | 37 | 25 | 55 |

TABLE 1-continued

|  |  | EXAMPLE 11 | EXAMPLE 12 | EXAMPLE 13 |
|---|---|---|---|---|
| HOMOPOLYPROPYLENE | WEIGHT AVERAGE MOLECULAR WEIGHT Mw | 413000 | 281000 | 480000 |
|  | NUMBER AVERAGE MOLECULAR WEIGHT Mn | 44300 | 33000 | 42000 |
|  | MOLECULAR WEIGHT DISTRIBUTION (Mw/Mn) | 9.3 | 8.5 | 11.4 |
|  | MELTING POINT (° C.) | 163 | 165 | 162 |
| EXTRUSION STEP | RESIN TEMPERATURE (° C.) | 200 | 200 | 200 |
| AGING STEP | AGING TEMPERATURE (° C.) | 133 | 155 | 155 |
|  | AGING TIME (HOUR) | 24 | 24 | 24 |
|  | ROTATION SPEED (rpm) | 0.1 | 0.1 | 0.1 |
| FIRST STRETCHING STEP | STRETCHING RATIO (TIME) | 1.4 | 1.2 | 1.2 |
| SECOND STRETCHING STEP | STRETCHING RATIO (TIME) | 2.2 | 2.0 | 2.0 |
| ANNEALING STEP | SHRINKAGE RATIO (%) | 5 | 5 | 5 |
| HOMOPOLYPROPYLENE MICROPOROUS FILM | DEGREE OF GAS PERMEABILITY (s/100 ml) | 395 | 217 | 164 |
|  | STANDARD DEVIATION OF DEGREE OF GAS PERMEABILITY (s/100 ml) | 6.7 | 6.4 | 3.4 |
|  | THERMAL SHRINKAGE RATIO (%) | 1.4 | 3.0 | 3.5 |
|  | STANDARD DEVIATION OF THERMAL SHRINKAGE RATIO (%) | 0.21 | 0.30 | 0.30 |
|  | LONGEST DIAMETER (nm) | 500 | 620 | 640 |
|  | AVERAGE LONGER DIAMETER (nm) | 250 | 355 | 380 |
|  | PORE DENSITY (PORE/$\mu m^2$) | 17 | 26 | 29 |
|  | SURFACE APERTURE RATIO (%) | 31 | 31 | 39 |

TABLE 2

|  |  | COMPARATIVE EXAMPLE 1 | COMPARATIVE EXAMPLE 2 | COMPARATIVE EXAMPLE 3 |
|---|---|---|---|---|
| HOMOPOLYPROPYLENE | WEIGHT AVERAGE MOLECULAR WEIGHT Mw | 413000 | 413000 | 413000 |
|  | NUMBER AVERAGE MOLECULAR WEIGHT Mn | 44300 | 44300 | 44300 |
|  | MOLECULAR WEIGHT DISTRIBUTION (Mw/Mn) | 9.3 | 9.3 | 9.3 |
|  | MELTING POINT (° C.) | 163 | 163 | 163 |
| EXTRUSION STEP | EXTRUSION RESIN TEMPERATURE (° C.) | 200 | 200 | 200 |
| AGING STEP | AGING TEMPERATURE (° C.) | 155 | 155 | 155 |
|  | AGING TIME (HOUR) | 24 | 24 | 24 |
|  | ROTATION SPEED (rpm) | 0 | 0 | 0 |
| FIRST STRETCHING STEP | STRETCHING RATIO (TIME) | 1.2 | 1.2 | 1.2 |
| SECOND STRETCHING STEP | STRETCHING RATIO (TIME) | 2.0 | 3.1 | 2.0 |
| ANNEALING STEP | SHRINKAGE RATIO (%) | 5 | 5 | 0 |
| HOMOPOLYPROPYLENE | DEGREE OF GAS PERMEABILITY (s/100 ml) | 182 | 511 | 184 |
| MICROPOROUS FILM | STANDARD DEVIATION OF DEGREE OF GAS PERMEABILITY (s/100 ml) | 10.6 | 50.3 | 44.0 |
|  | THERMAL SHRINKAGE RATIO (%) | 4.2 | 6.5 | 10.8 |
|  | STANDARD DEVIATION OF THERMAL SHRINKAGE RATIO (%) | 1.22 | 1.10 | 3.80 |
|  | LONGEST DIAMETER (nm) | 990 | 500 | 990 |
|  | AVERAGE LONGER DIAMETER (nm) | 400 | 240 | 390 |
|  | PORE DENSITY (PORE/$\mu m^2$) | 14 | 13 | 13 |
|  | SURFACE APERTURE RATIO (%) | 36 | 24 | 35 |

|  |  | COMPARATIVE EXAMPLE 4 | COMPARATIVE EXAMPLE 5 | COMPARATIVE EXAMPLE 6 |
|---|---|---|---|---|
| HOMOPOLYPROPYLENE | WEIGHT AVERAGE MOLECULAR WEIGHT Mw | 413000 | 413000 | 413000 |
|  | NUMBER AVERAGE MOLECULAR WEIGHT Mn | 44300 | 44300 | 44300 |
|  | MOLECULAR WEIGHT DISTRIBUTION (Mw/Mn) | 9.3 | 9.3 | 9.3 |
|  | MELTING POINT (° C.) | 163 | 163 | 163 |
| EXTRUSION STEP | EXTRUSION RESIN TEMPERATURE (° C.) | 200 | 190 | 200 |
| AGING STEP | AGING TEMPERATURE (° C.) | 155 | 158 | 129 |
|  | AGING TIME (HOUR) | 24 | 24 | 24 |
|  | ROTATION SPEED (rpm) | 0 | 0 | 0.1 |
| FIRST STRETCHING STEP | STRETCHING RATIO (TIME) | 1.4 | 1.4 | 1.2 |
| SECOND STRETCHING STEP | STRETCHING RATIO (TIME) | 3.1 | 3.1 | 2.0 |
| ANNEALING STEP | SHRINKAGE RATIO (%) | 0 | 0 | 5 |
| HOMOPOLYPROPYLENE | DEGREE OF GAS PERMEABILITY (s/100 ml) | 844 | 683 | 1042 |
| MICROPOROUS FILM | STANDARD DEVIATION OF | 196.0 | 120.4 | 33.2 |

TABLE 2-continued

| | | | |
|---|---|---|---|
| GAS PERMEABILITY (s/100 ml) | | | |
| THERMAL SHRINKAGE RATIO (%) | 14.0 | 22.2 | 1.1 |
| STANDARD DEVIATION OF THERMAL SHRINKAGE RATIO (%) | 7.30 | 6.20 | 0.20 |
| LONGEST DIAMETER (nm) | 1010 | 1015 | 370 |
| AVERAGE LONGER DIAMETER (nm) | 490 | 520 | 210 |
| PORE DENSITY (PORE/µm$^2$) | 7 | 11 | 10 |
| SURFACE APERTURE RATIO (%) | 41 | 48 | 19 |

INDUSTRIAL APPLICABILITY

The propylene-based resin microporous film of the present invention can allow ions such as lithium ions, sodium ions, calcium ions, and magnesium ions to smoothly and uniformly permeate therethrough. Accordingly, the propylene-based resin microporous film is suitably used as a separator for a battery.

The invention claimed is:

1. A propylene-based resin microporous film containing micropores, having a degree of gas permeability of 100 to 400 s/100 mL, a standard deviation of the degree of gas permeability of 7 s/100 mL or less, a thermal shrinkage ratio of 6% or less after heating at 105° C. for 2 hours, and a standard deviation of the thermal shrinkage ratio of 1% or less,
wherein the micropores are formed by uniaxially stretching a propylene-based resin film containing a propylene-based resin having a melting point of 160 to 165° C.

2. The propylene-based resin microporous film according to claim 1, having a surface aperture ratio of 25 to 55%.

3. The propylene-based resin microporous film according to claim 1, wherein aperture edges of the micropores have a longest diameter of 1 µm or smaller and an average longer diameter of 500 nm or smaller.

4. The propylene-based resin microporous film according to claim 1, having a pore density of 15 pores/µm$^2$ or more.

5. A separator for a battery, comprising the propylene-based resin microporous film according to claim 1.

6. A battery comprising the separator for a battery according to claim 5.

7. A propylene-based resin microporous film containing micropores, having a degree of gas permeability of 100 to 400 s/100 mL, a standard deviation of the degree of gas permeability of 7 s/100 mL or less, a thermal shrinkage ratio of 6% or less after heating at 105° C. for 2 hours, and a standard deviation of the thermal shrinkage ratio of 1% or less,
wherein the propylene-based resin microporous film is produced by a method comprising:
an extrusion step of supplying a propylene-based resin to an extruder, melt-kneading the resin, and extruding the resin through a T die attached to a tip of the extruder to obtain a propylene-based resin film;
an aging step of aging the propylene-based resin film obtained in the extrusion step under an atmosphere where a temperature is equal to or higher than a temperature lower than the melting point of the propylene-based resin by 30° C. and equal to or lower than a temperature lower than the melting point of the propylene-based resin by 1° C. for 1 hour or longer;
a stretching step of uniaxially stretching the propylene-based resin film after the aging step; and
an annealing step of annealing the propylene-based resin film after the stretching step,
wherein a melting point of the propylene-based resin is 160 to 165° C.

8. A propylene-based resin microporous film containing micropores, having a degree of gas permeability of 100 to 400 s/100 mL, a standard deviation of the degree of gas permeability of 7 s/100 mL or less, a thermal shrinkage ratio of 6% or less after heating at 105° C. for 2 hours, and a standard deviation of the thermal shrinkage ratio of 1% or less,
wherein the propylene-based resin microporous film is produced by a method comprising:
an extrusion step of supplying a propylene-based resin to an extruder, melt-kneading the resin, and extruding the resin through a T die attached to a tip of the extruder to obtain a propylene-based resin film;
an aging step of winding the propylene-based resin film obtained in the extrusion step into a roll to obtain a propylene-based resin film roll, and aging the propylene-based resin film roll under an atmosphere where a temperature is equal to or higher than a temperature lower than the melting point of the propylene-based resin by 30° C. and equal to or lower than a temperature lower than the melting point of the propylene-based resin by 1° C. for 1 hour or longer while the propylene-based resin film roll is rotated in a circumferential direction;
a stretching step of unwinding the propylene-based resin film from the propylene-based resin film roll after the aging step, and uniaxially stretching the propylene-based resin film; and
an annealing step of annealing the propylene-based resin film after the stretching step,
wherein a melting point of the propylene-based resin is 160 to 165° C.

* * * * *